US012754916B2

(12) United States Patent
(10) Patent No.: US 12,754,916 B2

Berkman et al.
(45) Date of Patent: *Oct. 6, 2026

(54) CRITERIA-BASED API SELECTION FOR DATA ACCESS

(71) Applicant: Own Data Company Ltd., Tel Aviv (IL)

(72) Inventors: Ariel Berkman, Herzliya (IL); Idan Liani, Ramat Gan (IL); Shay Israel Michaeli, Ashdod (IL); Binyamin Joseph Schein, Tel Aviv (IL); Idan Narotzki, Haifa (IL)

(73) Assignee: Salesforce, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/067,911

(22) Filed: Mar. 2, 2025

(65) Prior Publication Data

US 2025/0231944 A1 Jul. 17, 2025

Related U.S. Application Data

(63) Continuation of application No. 17/851,094, filed on Jun. 28, 2022, now Pat. No. 12,242,484.

(51) Int. Cl.

| | |
|---|---|
| ***G06F 16/00*** | (2019.01) |
| ***G06F 11/1446*** | (2026.01) |
| ***G06F 16/18*** | (2019.01) |
| ***G06F 16/21*** | (2019.01) |
| ***G06F 16/2455*** | (2019.01) |

(52) U.S. Cl.

CPC .... *G06F 16/24553* (2019.01); *G06F 11/1448* (2013.01); *G06F 16/1815* (2019.01); *G06F 16/217* (2019.01); *G06F 2201/84* (2013.01)

(58) Field of Classification Search

CPC ............ G06F 16/24553; G06F 16/217; G06F 16/1815

USPC ........................................................ 707/769

See application file for complete search history.

(56) References Cited

U.S. PATENT DOCUMENTS

| | | | | |
|---|---|---|---|---|
| 2020/0278881 | A1* | 9/2020 | Mathur | G06F 9/547 |
| 2021/0191825 | A1* | 6/2021 | Chopra | G06F 11/1451 |
| 2022/0156238 | A1* | 5/2022 | Kunzle | G06F 16/1815 |
| 2023/0141909 | A1* | 5/2023 | Truscott | G06F 21/568 726/23 |

* cited by examiner

*Primary Examiner* — Chelcie L Daye

(74) *Attorney, Agent, or Firm* — Meitar Patents LTD.; Daniel Kligler

(57) ABSTRACT

Methods, storage systems and computer program products implement embodiments of the present invention for data access that include identifying a set of tables in a database to be accessed by an application, and identifying first and second application programming interface (API) calls having different, respective access properties for accessing records in the tables via an API. Respective numbers of the records in the tables are counted by a processor, and the set of tables are partitioned into first and second subsets responsively to the respective numbers. The records in the first subset of the tables are accessed by having the application convey the first API call to the API, and the records in the second subset of the tables are accessed by having the application convey the second API call to the API.

19 Claims, 7 Drawing Sheets

CRITERIA-BASED API SELECTION FOR DATA ACCESS

CROSS-REFERENCE TO RELATED APPLICATION

This application is a continuation of U.S. patent application Ser. No. 17/851,094, filed Jun. 28, 2022, whose disclosure is incorporated herein by reference.

FIELD OF THE INVENTION

The present invention relates generally to application programming interfaces (APIs), and particularly to dynamically selecting, based on specified criteria, API calls so as to access data on a server.

BACKGROUND OF THE INVENTION

In computer programming, an application programming interface (API) is a set of building blocks that programmers can use to develop software applications. APIs enable two pieces of software to communicate by enabling one application to plug directly into the data and services of another application. Popular types of APIs include APIs for web-based systems, operating systems, database systems and computer hardware.

Along with the increasing number of deployed web-based systems, there is also an increasing number of software applications that access services provided by these systems via their respective web APIs. Web APIs are typically either Simple Object Access Protocol (SOAP) APIs or Representational State Transfer (REST) APIS. REST APIs are optimized for the web, offer a single uniform interface, and typically have excellent performance and scalability. SOAP APIs, while being more complex than REST APIs, typically offer tighter security.

Documents incorporated by reference in the present patent application are to be considered an integral part of the application except that to the extent any terms are defined in these incorporated documents in a manner that conflicts with the definitions explicitly or implicitly in the present specification, only the definitions in the present specification should be considered.

The description above is presented as a general overview of related art in this field and should not be construed as an admission that any of the information it contains constitutes prior art against the present patent application.

SUMMARY OF THE INVENTION

There is provided, in accordance with an embodiment of the present invention, a method for data access, including identifying a set of tables in a database to be accessed by an application, identifying first and second application programming interface (API) calls having different, respective access properties for accessing records in the tables via an API, computing, by a processor, respective counts of the records in the tables, partitioning the set of tables into first and second subsets responsively to the respective counts, accessing the records in the first subset of the tables by conveying, by the application, the first API call to the API, and accessing the records in the second subset of the tables by conveying, by the application, the second API call to the API.

In some embodiments, a given table includes a customer relationship management data file.

In one embodiment, accessing the records in the first and the second subsets includes generating a set of backup files for the set of tables.

In another embodiment, generating a given backup file includes storing, to the given backup file, a link to a previously generated backup file.

In an additional embodiment, the backup files include structured text files.

In a further embodiment, the structured text files include comma-separated (CSV) files.

In a supplemental embodiment, the method further includes compressing a given structured text file so as to generate a compressed backup file.

In one embodiment, accessing, in a given table, the records with a given access property includes conveying a request for one or more attribute values in one or more records in the given table, receiving the requested attribute values, and saving the received attribute values to a corresponding set of one or more records in a given backup file.

In another embodiment, accessing, in a given table, the records with a given access property includes conveying a request to generate a given backup file for a given table.

In an additional embodiment, the request to generate a given backup file for a given table includes a request to generate a plurality of backup files that store copies of attribute values in respective subsets of the records in the given table.

In a supplemental embodiment, the method further includes conveying a request to combine the plurality of backup files into a single combined backup file.

In a further embodiment, the first and the second subsets include disjoint subsets of the tables.

In some embodiments, the disjoint subsets cover the set of tables.

In one embodiment, the first API call has an API call quota, and partitioning the set of tables into first and second subsets includes assigning one or more of the tables to the first subset responsively to the quota.

In another embodiment, the tables include table attributes, and wherein partitioning the set of tables into first and second subsets includes assigning one or more of the tables to the first subset responsively to the respective table attributes of the tables.

In an additional embodiment, partitioning the set of tables into first and second subsets responsively to the respective counts includes identifying a first group of the tables whose respective counts of records are less than a specified threshold, identifying a second group of the tables whose respective counts of records are greater than or equal to the specified wherein the first subset includes the first group of tables, and wherein the second subset includes the second group of tables.

There is also provided, in accordance with an embodiment of the present invention, an apparatus for data access, including a network interface controller (NIC), and a processor configured to identify a set of tables in a database to be accessed by an application, to identify first and second application programming interface (API) calls having different, respective access properties for accessing records in the tables via an API, to compute respective counts of the records in the tables, to partition the set of tables into first and second subsets responsively to the respective counts, to access the records in the first subset of the tables by conveying, by the application over a data network via the NIC, the first API call to the API, and to access the records in the second subset of the tables by conveying, by the application over a data network via the NIC, the second API call to the API.

There is additionally provided, in accordance with an embodiment of the present invention, a computer software product for data access, the product including a non-transitory computer-readable medium, in which program instructions are stored, which instructions, when read by a computer, cause the computer to identify a set of tables in a database to be accessed by an application, to identify first and second application programming interface (API) calls having different, respective access properties for accessing records in the tables via an API, to compute respective counts of the records in the tables, to partition the set of tables into first and second subsets responsively to the respective counts, to access the records in the first subset of the tables by conveying, by the application, the first API call to the API, and to access the records in the second subset of the tables by conveying, by the application, the second API call to the API.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

A software system that manages a corpus of data (e.g., a database) may provide an application programming interface (API) that offers different ways of accessing the data. For example, SALESFORCE™ (provided by SALESFORCE. COM INC., San Francisco, CA, USA) provides both representational state transfer (REST) and Bulk API calls for accessing attribute values stored in SALESFORCE™ objects.

Embodiments of the present invention provide methods and systems for access a corpus of data stored in sets of database tables. As described hereinbelow, a set of tables in a database to be accessed by an application are identified, and first and second application programming interface (API) calls having different, respective access properties for accessing records in the tables via an API are also identified. Upon computing respective counts of the records in the tables, the set of tables can be partitioned into first and second subsets responsively to the respective counts. Subsequent to partitioning the tables, the records in the first subset of the tables can be accessed by conveying, by the application, the first API call to the API, and the records in the second subset of the tables can be accessed by conveying, by the application, the second API call to the API.

Systems implementing embodiments of the present invention enable software systems to manage usage of different API calls (i.e., for accessing a single corpus of data) in order to optimize system performance, utilization and processing costs (e.g., execution time and/or API consumption), and to accommodate any usage restrictions for the API calls. In one example, a given API call may be restricted to access (only) specific database tables.

In a second embodiment, a first given API call may be more expensive (but more efficient) than a second API call when accessing a given table. In a third example, a software application may limit usage (i.e., by setting a maximum usage threshold) of a given API call during a specific period (e.g., a day, a week or a month).

System Description

Figure 1:
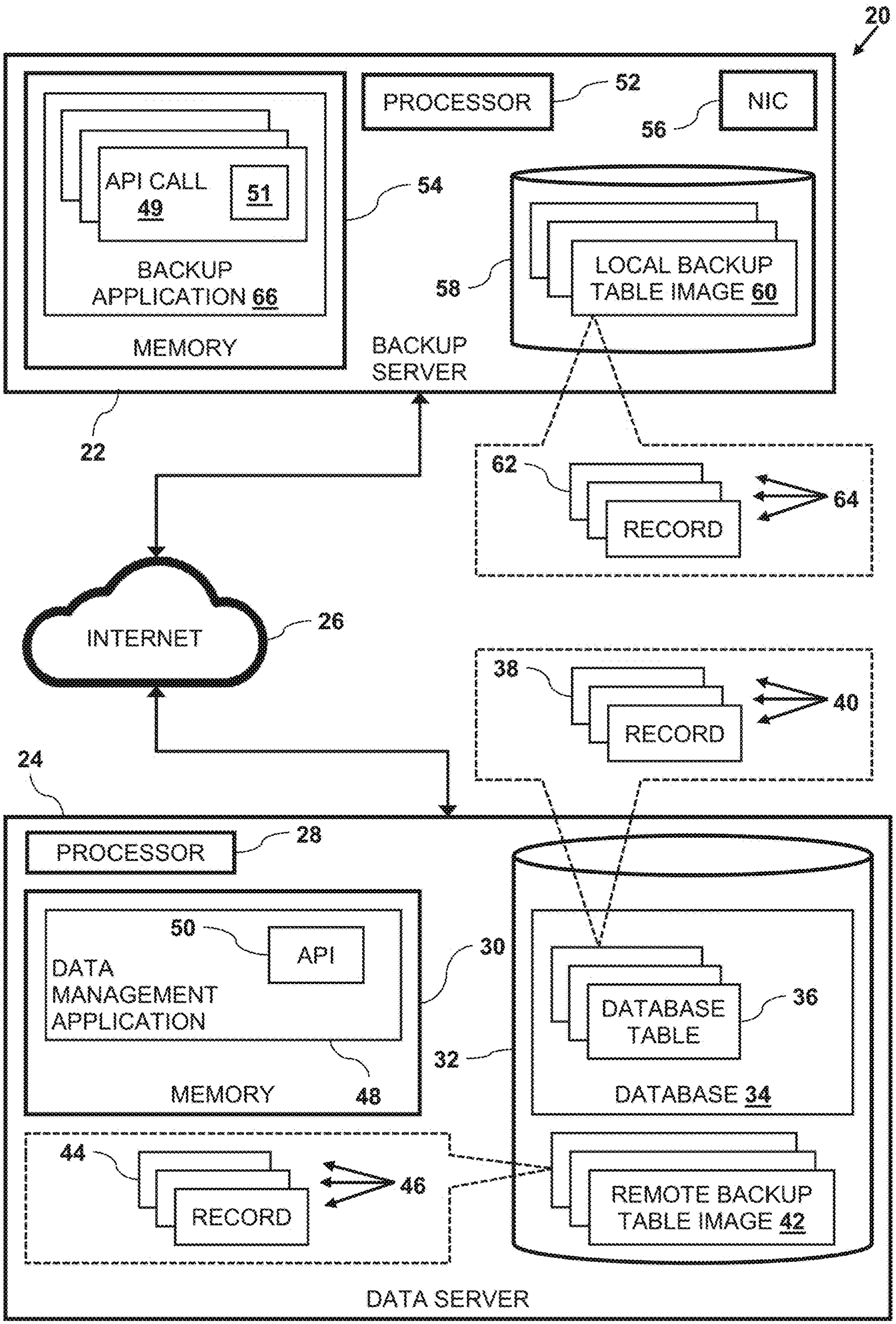
FIG. 1 is a block diagram schematically shows a computing facility comprising a backup server that can access multiple database tables stored on a data server, in accordance with an embodiment of the present invention.

FIG. 1 is a block diagram that schematically shows a computing facility 20 comprising backup server 22, in accordance with an embodiment of the present invention. In the configuration shown in FIG. 1, servers 22 and 24 can communicate with each other via a data network 26 such as the Internet.

Data server 24 may comprise a data processor 28, a data memory 30 and a data storage device 32 that stores a database 34. In the configuration shown in FIG. 1, database 34 comprises a set of database tables 36 comprising respective sets of database records 38 that store database attribute values 40.

Storage device 32 may also store remote backup table images 42 that comprise respective sets of remote backup records 44 that store remote backup attribute values 46. In embodiments described herein remote backup tables images 42 stored on data server 24 comprise backups of data tables 36. In one embodiment, a given remote backup table image 42 may comprise a copy (i.e., a backup) of all the database records in a given database table 36. In another embodiment (as described hereinbelow), a given remote backup table image 42 may comprise a copy of a subset the database records in a given database table 36.

Memory 30 stores a data management application 48 that processor 28 can execute so as to provide access to (i.e., adding, deleting, modifying and reading data to/in) database records 38 in database tables 36. For example, data management application 48 may comprise SALESFORCE™, and database tables 36 may comprise SALESFORCE™ objects.

In some embodiments, data management application 48 comprises an application programming interface (API) 50.

As described hereinbelow, backup server 22 (or any other computing device communicating with data server 24) can convey, via data network 26, API calls 49 to API 50 so as to access one or more database tables 36 in database 34. Examples of API calls 49 to API 50 are described in the description referencing FIGS. 3 and 4 hereinbelow.

In some embodiments, API calls 49 may have different respective API access properties 51. A given API access property 51 may comprise a request for a specific activity to be performed by data management application 48 upon receiving a call to API 50. Examples of API access properties 51 are described in the description referencing FIG. 2 hereinbelow.

Backup server 22 may comprise a backup processor 52, a backup memory 54 and a network interface controller (NIC) 56 that couples the backup server to data network 26. In some embodiments, backup server 22 also comprises and a backup storage device 58 that stores a database 34. In the configuration shown in FIG. 1, database 34 comprises a set of local backup table images 60 that comprise respective sets of local backup records 62 that store local backup attribute values 64. Similar to remote backup table images 42, each given local backup table image 69 may comprise a copy (i.e., a backup) of all the database records in a given database table 36 or a copy of a subset the database records in a given database table 36.

In some embodiments, backup table images 42 and 60 may comprise structured text files such as comma-separated value (CSV) files that are non-relational (i.e., not linked) and can economically be stored in a data cloud infrastructure such as GOOGLE CLOUD PLATFORM™ (provided by ALPHABET INC., Mountain View, California, USA). In these embodiments, backup records 44 and 62 may comprise "rows" in the structured text files that store backup attribute values 46 and 64 in a human-readable format. In additional embodiments processors 28 and 52 may compress table images 42 and 60 so as to generate compressed structured text files.

In the configuration shown in FIG. 1, memory 54 comprises a backup management application 66. In some embodiments, processor 52 can access on or more database tables 36 by executing backup management application 66, which conveys API calls 49 (i.e., comprising respective API access properties 51) to API 50 in data management application 48.

Processors 28 and 52 comprise general-purpose central processing units (CPU) or special-purpose embedded processors, which are programmed in software or firmware to carry out the functions described herein. This software may be downloaded to servers 22 and 24 in electronic form, over a network, for example. Additionally or alternatively, the software may be stored on tangible, non-transitory computer-readable media, such as optical, magnetic, or electronic memory media. Further additionally or alternatively, at least some of the functions of processors 28 and 52 may be carried out by hard-wired or programmable digital logic circuits.

Examples of memories 30, 32, 54 and 58 include dynamic random-access memories and non-volatile random-access memories. Additionally or alternatively, the memories may comprise non-volatile storage devices such as hard disk drives and solid-state disk drives.

In some embodiments, the functionality of some or all of servers 22 and 24 may be deployed in a data cloud and/or as virtual machines in one or more computing facilities such as computing facility 20. In one embodiment, the backup server that is described herein as a single computer may comprise multiple physical and/or virtual computers that execute and/or store respective portions of backup management application 66 and/or local backup table images 60. In other words, portions of backup management application 66 and/or local backup table images 60 can be distributed over a plurality of virtual machines and/or physical computers.

In another embodiment, servers 22 and 24 may comprise a single virtual machine or a single physical computer. In other words, data management application 48 and backup management application 66 may execute on a single virtual machine or a single physical computer.

Dynamic Criteria-Based API Assignment

Figure 2:
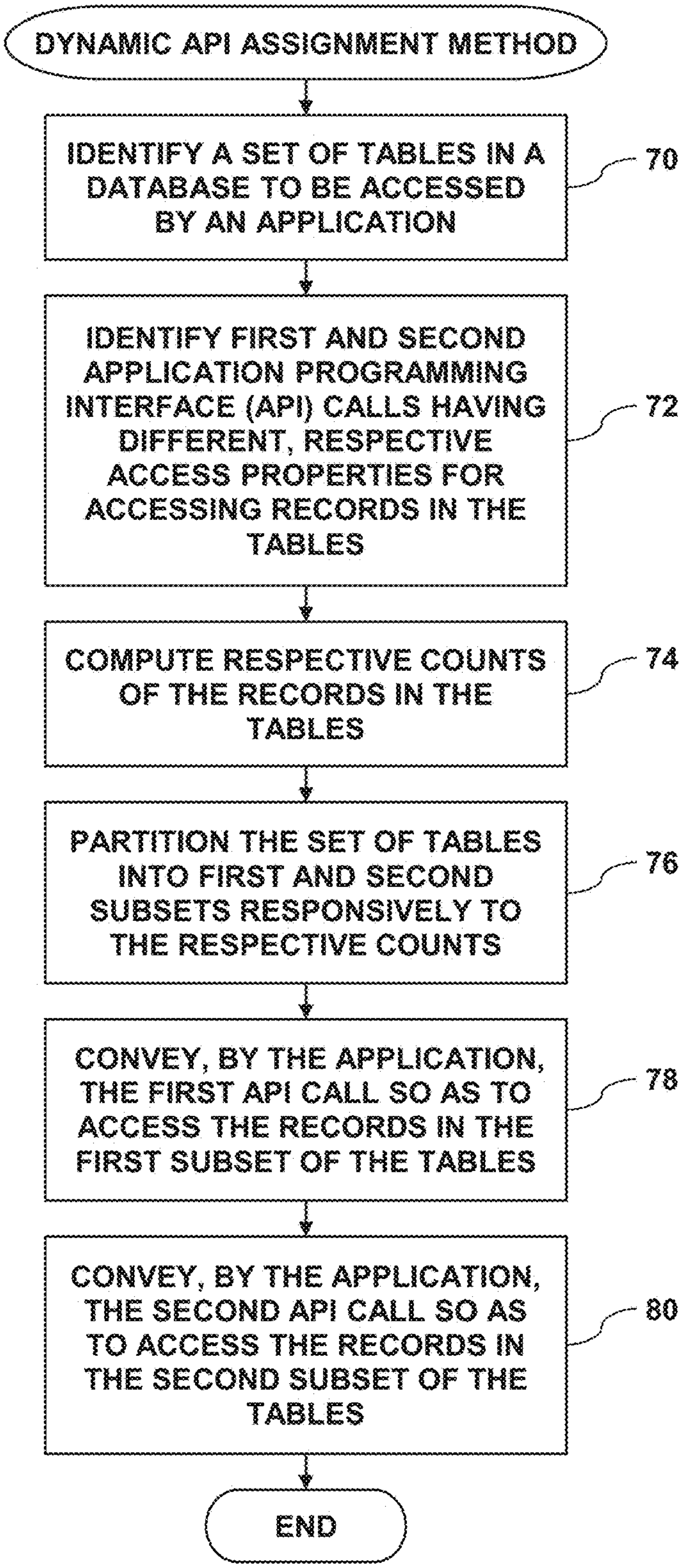
FIG. 2 is a flow diagram that schematically illustrates a method of assigning, from a set of application programming interface (API) calls, a given API call to each of the database tables, in accordance with an embodiment of the present invention.

FIG. 2 is a flow diagram that schematically illustrates a method of dynamically assigning a given API call 49 to each of database table 36, in accordance with an embodiment of the present invention. In some embodiments, processor 52 can convey API calls 49 to API 50 so as to access each given database table 36. Upon assigning the API calls to the database tables, processor 52 can then access a given database table 36 by conveying is respective assigned API call 49 to API 50.

In step 70, processor 52 identifies (i.e., selects) a set of database tables 36. In embodiments described herein, backup management application 66 can generate backups (i.e., backup table images 42 and/or 60) by accessing the database tables selected by processor 52.

In step 72, processor 52 identifies a first given API call 49 and a second given API call 49 that have different respective API access properties 51 for accessing the database records in the selected database tables. As described supra, embodiments of the present invention enable local backup management application 66 to create backup table images 42 and/or 60 by accessing (i.e., conveying API calls 49 to) API 50.

In some embodiments, database 34 comprises a SALESFORCE™ object, database tables 36 comprise SALESFORCE™ CRM data files, and data management application 48 comprises the SALESFORCE™ system that comprises two API calls 49 having different respective API access properties 51 for accessing database records 38. In these embodiments:

- A first given API access property 51 for a given API call 49 may comprise a representational state transfer (REST) API access property that enables backup management application 66 to convey a given API call 49 to API 50 instructing data management application 48 to convey to, backup server 22, attribute values 40 from database records 38. Upon receiving the conveyed attribute values, backup application 66 (i.e., processor 62) can store the received attribute values to local backup records 62. In some embodiments, a given API call 49 comprising the REST API access property may be referred to as REST API call 49.
- A second given API access property 51 for a given API call 49 may comprise a SALESFORCE™ Bulk API access property that enables backup management application 66 to convey a given API call to API 50 instructing data management application 48 to copy one or more database tables 36 to remote backup table images 42, thereby backing up the one or more database tables. Upon receiving, from data management application 48, a message indicating completion of the backup, processor 52 can copy, via data network 26, remote backup table images 42 to local backup table images 60. In some embodiments, a given API call 49 comprising the Bulk API access property 51 may be referred to as Bulk API call 49.

As described hereinbelow, another variation of bulk API access property 51 is bulk PK API access property 51. In some embodiments, a given API call 49 comprising the Bulk PK API access property 51 may be referred to as Bulk PK API call 49.

In step 74, processor 52 computes respective counts of the database records in the selected database tables. To compute the counts, backup management application 66 can convey a request to data management application 48 to compute the counts, and upon receiving the request, the data management application can convey a response comprising the counts.

In step 76, responsively to the computed counts, processor 52 partitions the selected set of the selected database tables into first and second subsets (i.e., of the database tables). In some embodiments, the first and the second subsets comprise disjoint subsets of the database tables whose union covers the entire set of the selected database tables.

In step 78, backup application 66 accesses the database records in the first subset of database tables 36 by conveying, via NIC 56 over data network 26, the first API call to API 50 in data management application 48 executing on processor 28.

Finally, in step 80, processor 52 accesses the database records in the second subset of database tables 36 by conveying, via NIC 56 over data network 26, the second API call to API 50 in data management application 48 executing on processor 28.

In one embodiment, processor 52 accessing the database records in the first and the second subsets of database tables 36 comprises the backup processor generating local backup table images 60, and then copying attribute values 40 in database records 38 to attribute values 64 in local backup records 62. In another embodiment, processor 52 accessing the database records in the first and the second subsets of database tables 36 comprises the backup processor generating remote backup table images 42, and then copying attribute values 40 in database records 38 to remote backup attribute values 46 in remote backup records 44. Backup table images 42 and 60 may also be referred to herein as respective sets of backup files.

In other words, processor 52 "assigns" API calls 49 to database tables 36, and then accesses the database tables via their respective assigned API calls. While embodiments herein describe assigning, to a given database table 36, a given API call 49 from a pool of two (i.e., a first and a second) API calls 49, assigning, to a given database table 36, a given API call 49 from a pool of any plurality of API calls 49 is considered to be within the spirit and scope of the present invention.

Figure 3:
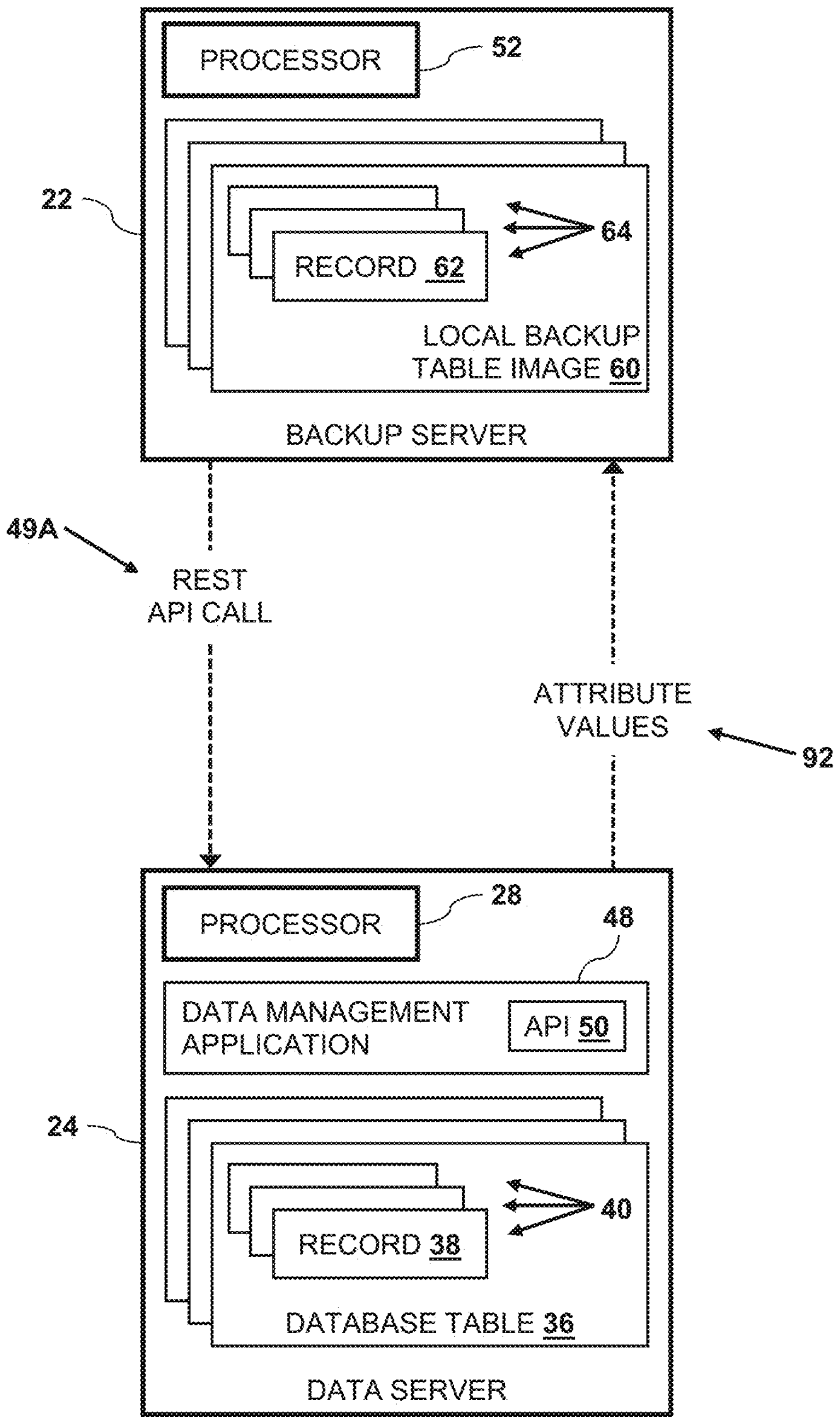
FIG. 3 is a block diagram that schematically illustrates data flowing between the backup server and the data server when using a first given API call to access a given data table, in accordance with a first embodiment of the present invention.
Figure 4:
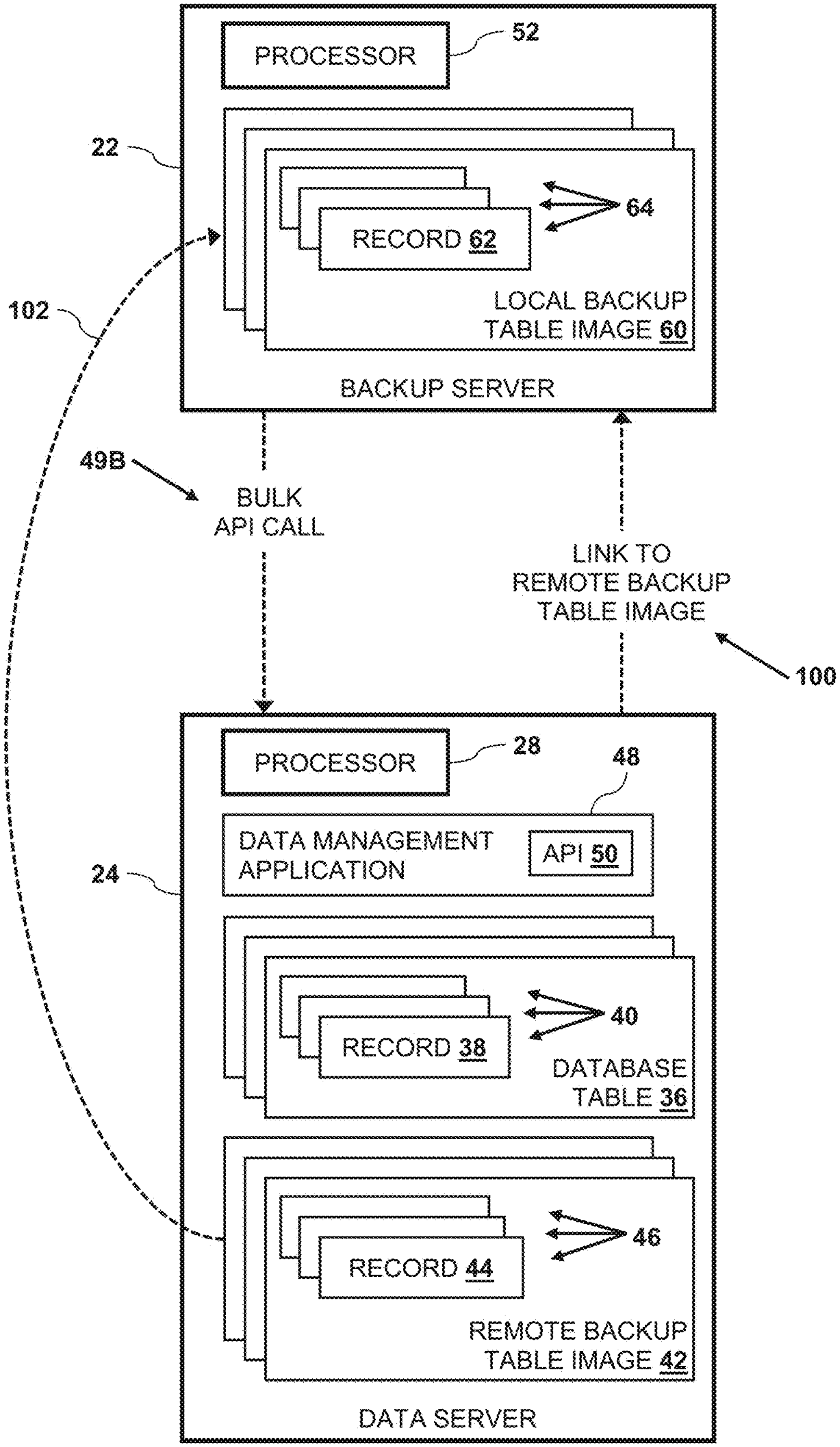
FIG. 4 is a block diagram that schematically illustrates data flowing between the backup server and the data server when using a second given API call to access a given data table, in accordance with a second embodiment of the present invention.
Figure 5:
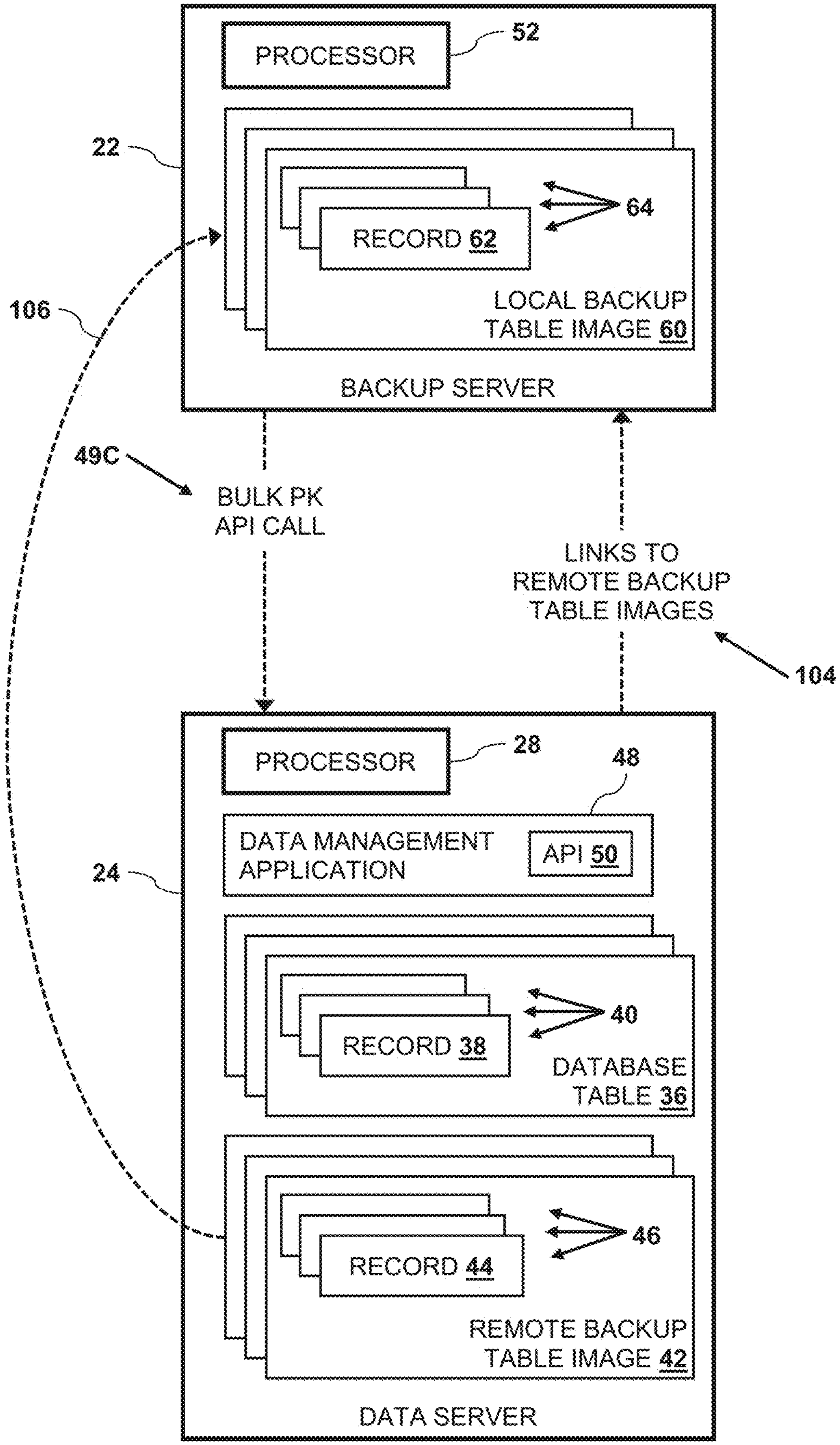
FIG. 5 is a block diagram that schematically illustrates data flowing between the backup server and the data server when using a third given API call to access a given data table, in accordance with a second embodiment of the present invention.

FIGS. 3-5 are block diagrams that schematically illustrate respective data flows between backup server 22 and data server 24, in accordance with embodiments of the present invention. In the description referencing FIGS. 3-5 hereinbelow, database tables 36 comprise SALESFORCE™ objects (i.e., either standard, custom or external) that processor 52 can access via SALESFORCE™ REST, Bulk or Bulk PK API calls.

In FIGS. 3-5, the data flows comprise API calls 49 from processor 52 to API 50, wherein the API calls and their respective access properties 51 can be differentiated by appending a letter to the identifying numeral, so that the API calls comprise API calls 49A-49C and the access properties comprise access properties 51A-51C. In embodiments herein, API call 49A may also be referred to as REST API call 490A (i.e., a SALESFORCE™ REST API call), API call 49B may also be referred to as Bulk API call 49B (i.e., a SALESFORCE™ Bulk API call) and API call 49C may also be referred to as Bulk PK call 49C (i.e., a SALESFORCE™ Bulk PK API call).

In the example shown in FIG. 3, processor 52 conveys, to data server 24, REST API call 49A comprising a request for database data attribute values 40 in one or more database records 38. In response to receiving the request, processor 28 retrieves the requested database data attribute values, and conveys, to backup server 22, a response 92 comprising the requested database attribute values. In embodiments herein, response 92 may also be referred to as requested database attribute values 92.

The following is an example of a given REST API call 49A to back up a given database table 36 (i.e., a SALESFORCE™ object) named "ORDER":

```
GET /services/data/v50.0/queryAll/?q=SELECT
Id,SystemModstamp FROM TBL ORDER BY Id
```

Upon receiving requested database attribute values 92, processor 52 can store the received database attribute values to local backup attribute values 64 in local backup record(s) 62, thereby generating a backup copy of database tables 36.

In the example shown in FIG. 4, processor 52 conveys, to data server 24, Bulk API call 49B comprising a request to generate a backup of a given database table 36. In response to receiving the request, processor 28 can create the backup of the given database table by initializing (i.e., creating) a new remote backup table image 42, and copying database records 38 in the given database table to remote backup records 44 in the new remote backup table image 42.

The following is an example of a given Bulk API call 49B to back up a given database table 36 (i.e., a SALESFORCE™ object):

```
POST /services/async/v50.0/job with data:
{'operation': 'queryAll' , 'object': 'TBL',
'content Type' : 'CSV', "concurrencyMode:'Parallel'}
```

Upon generating the backup comprising the new remote backup table image 42, processor 28 can convey, to backup server 22, a response 100 comprising a link to the new remote backup table image on data server 24. In embodiments herein, response 100 may also be referred to as link 100. In one embodiment, link 100 may comprise a directory path and a file name for the new remote backup table images on data server 24. In another embodiment link 100 may comprise respective uniform resource locator (URL) for the new remote backup table image on data server 24.

In some embodiments, upon receiving a link 100 corresponding to a given remote backup table image, processor 52 can access the URL in the link so as to download the given remote backup table image to a given local backup table image 60, as indicating by an arrow 102.

In the example shown in FIG. 5, processor 52 conveys, to data server 24, Bulk PK API call 49C comprising a request to generate a backup of a given database table 36. In response to receiving the request, processor 28 can create the backup of the given database table by initializing a set of new remote backup table images 42, and copying, to remote backup records 44 in the new remote backup table images 42, respective subsets of a set of records 38 in the given database table, wherein the set of database records 38 comprise all database records 38 in the given database table.

Bulk PK API call 49C comprises a request to generate multiple remote backup table images 42 (i.e., as a backup for a given database table 36) wherein the multiple remote backup table images 42 comprise respective "chunks" 42. In embodiments herein, processor 28 generating multiple remote tables images 42 in response to receiving Bulk PK API call 49C may be referred to as "chunking".

The following is an example of a given Bulk PK API call 49C to back up a given database table 36 (i.e., a SALES-FORCE™ object):

```
POST /services/async/v50.0/job with data:
{'operation': 'queryAll', 'object': 'TBL',
'contentType': 'CSV', "concurrencyMode:'Parallel'}
and header 'Sforce-Enable-PKChunking'='true;
chunkSize=4000000'
```

To download the remote backup tables images that processor 28 generated in response to receiving the Bulk PK API call, processor 52 can convey the following "download" API call 49 for each "batch" (i.e., the set of generated remote backup tables images 42):

POST/services/async/v50.0/job/{job id}/batch

Upon generating the new remote backup table images 42, processor 28 can convey, to backup server 22, a response 104 that comprising respective links to the generated remote backup table images on data server 24. In embodiments herein, response 104 may also be referred to as links 104. In one embodiment, each given link 104 may comprise a directory path and a file name for the respective remote backup table image 42 on data server 24. In another embodiment each given link 104 may comprise a URL for a given remote backup table image 42 on data server 24.

In some embodiments, upon receiving a given link 104 corresponding to a given remote backup table image, processor 52 can access the URL in the given link so as to download the respective remote backup table image 42 to a given local backup table image 60, as indicating by an arrow 106.

When using Bulk PK API call 49C to generate a backup of a given database table 36, the subsets (i.e., each of the new remote backup table images in the set) may comprise disjoint subsets of database records 38 in the given database whose unions covers the entire set of database records 38 (i.e., in a given database table 36). Therefore, each database record 38 in the set of records has a corresponding remote backup record 44 in a given remote backup table image 42.

Figure 6A:
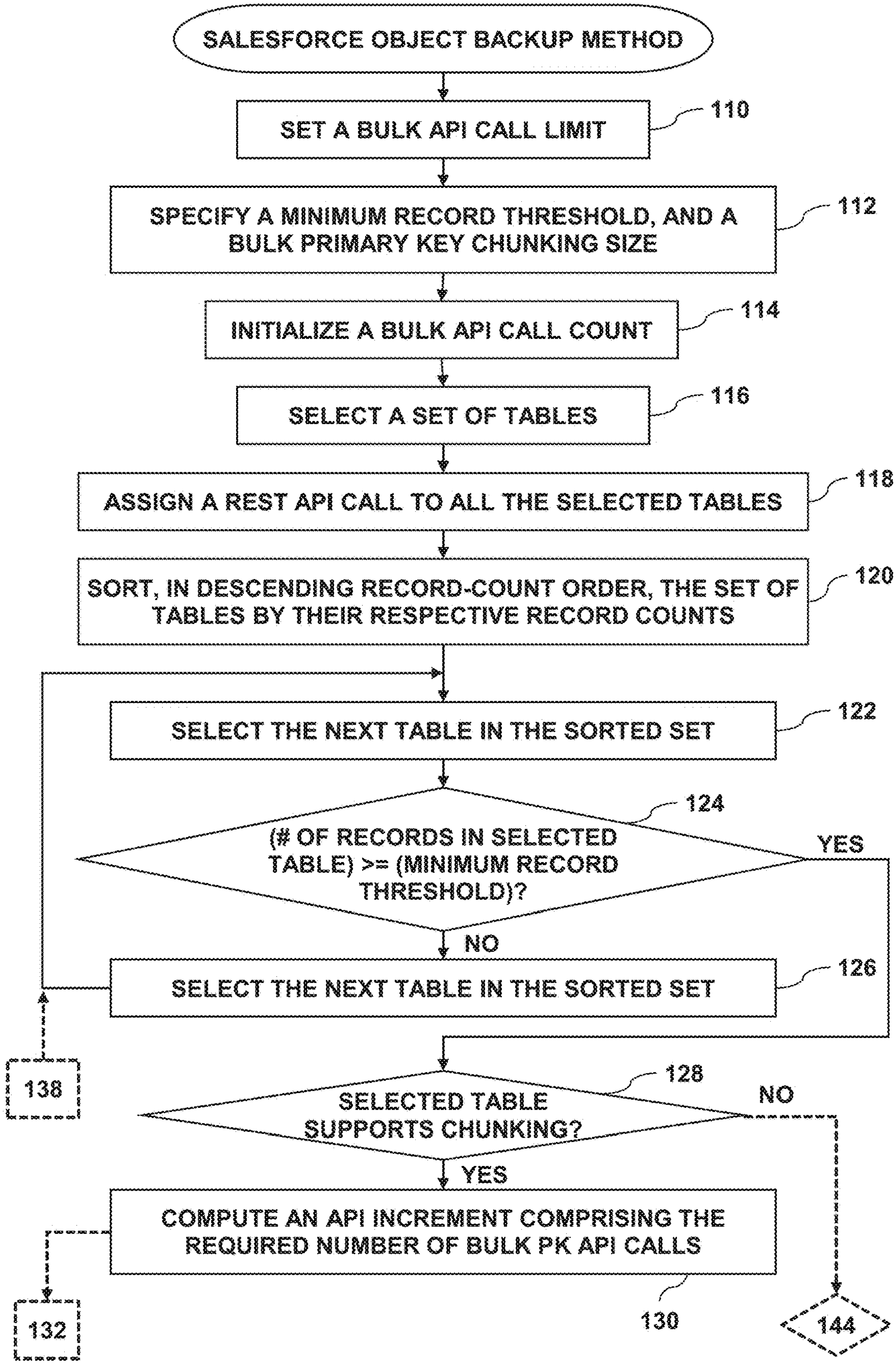
FIGS. 6A-6B, also referred to herein collectively as FIG. 6, are flow diagrams that schematically illustrate a method of using the first, second and third given API calls to perform a backup of the multiple database tables, in accordance with an embodiment of the present invention.
Figure 6B:
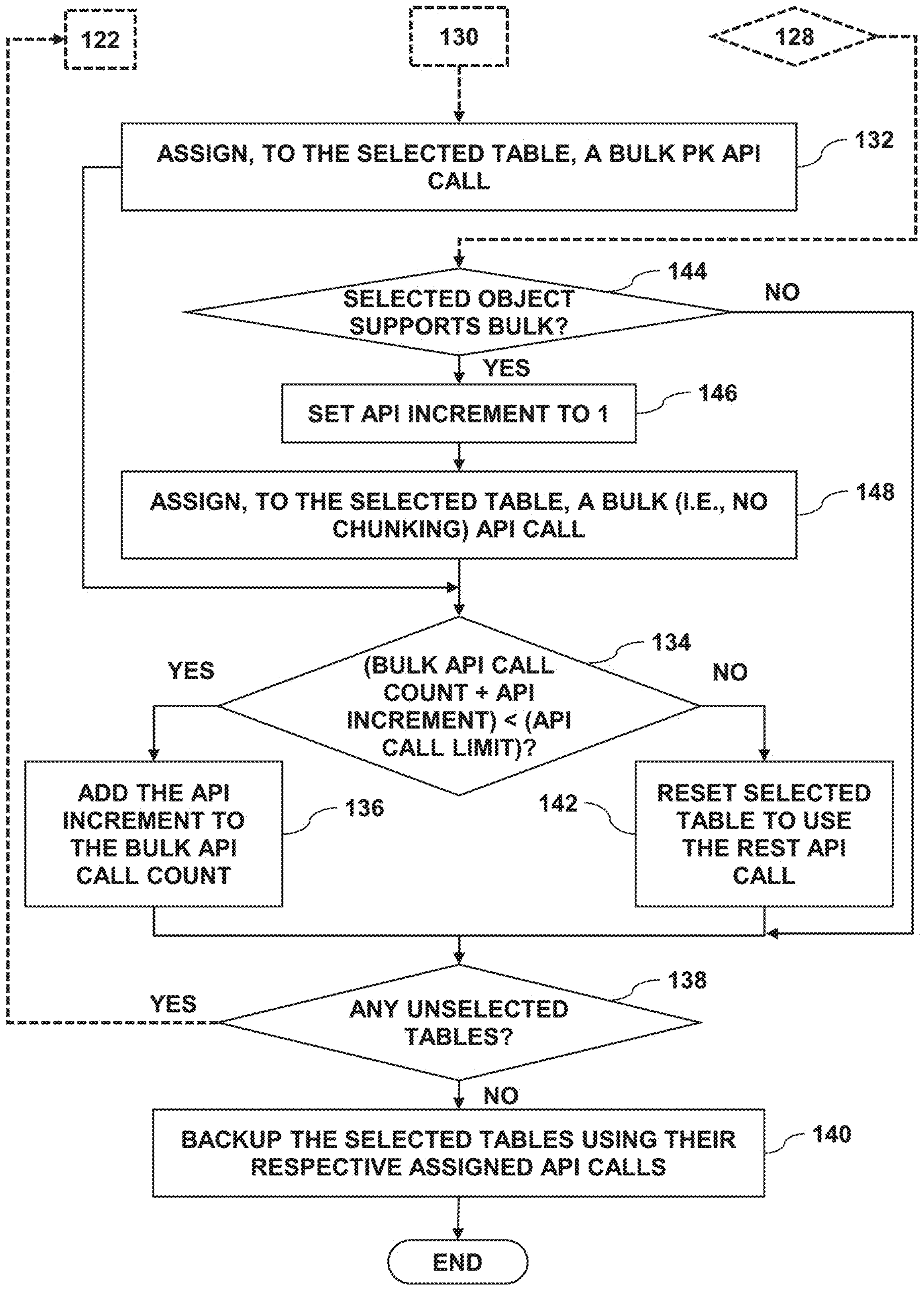

FIGS. 6A-6B, also referred to herein collectively as FIG. 6, are flow diagrams that schematically illustrate a method of using the first, second and third given API calls to perform a backup of the multiple database tables, in accordance with an embodiment of the present invention.

As described supra, processor 52 can generate a backup of a given database table 36 by conveying a given API call 49 to API 50. In some embodiments, data management application 48 may set a quota comprising a maximum number of API calls 49 to API 50 during a specified time period. For example, SALESFORCE™ allows 15,000 daily Bulk API calls 50B and/or Bulk PK API calls 50C (i.e., within a period of time comprising 24 consecutive hours) to its API.

In step 110 (FIG. 6A), processor 52 sets a bulk API call limit (i.e., for Bulk API calls 49B and/or Bulk PK API calls 49C). For example, in a SALESFORCE™, the Bulk API call limit may be 90% (13,500) of a daily limit (e.g., 15,000).

In step 112, processor 52 specifies a minimum record threshold and bulk primary key chunking size (also referred to herein simply as a chunking size). In embodiments described herein, the minimum records threshold comprises a minimum number of records (e.g., 2,000,000 or 4,000,000) in any given database table 36 for using Bulk API call 49B to back up the given database table 36.

While embodiments described herein use a minimum record threshold for selecting a given API call 49, using other thresholds is considered to be within the spirit and scope of the present invention. For example, the minimum threshold may be a specified size (e.g., 10, 15 or 20 megabytes) of a given database table 36.

As described supra, there may be a daily (or another specified time period) limit for a specific API call 49 (e.g., Bulk API calls 49B and/or Bulk PK API calls 49C). Setting the minimum record threshold enables efficient allocation of API calls 49A-49C so as to remain within the daily limit. While the example described herein allocates three different API calls 49, the Bulk API calls and the Bulk PK API calls can be regarded as a single API call 49, since the daily limit for Bulk API calls 49B also includes Bulk PK API calls 49C.

As described in the description referencing the second embodiment in FIG. 4 hereinabove, processor 52 can back up a given database table 36 by convey Bulk PK API calls 90C to API 50 so as to generate multiple remote backup table images 42 (i.e., chunks 42). In some embodiments, the specified chunking size comprises a maximum number (e.g., 100,000, 200,000 250,000 or 300,000) of database records 38 for each chunk 42.

In step 114, processor 52 initializes a Bulk API call count (i.e., to zero).

In step 116, processor 52 selects a set of database tables 36. In embodiments described hereinbelow, processor 52 can generate backup tables images 42 and/or 60 for the selected database tables.

In step 118, processor 52 assigns REST API call 49A to all the selected database tables.

In step 120, processor 52 determines counts of database records 38 in the selected database tables and generates a list (not shown) of the selected database tables in descending record-count order.

In step 122, processor 52 selects the next database table 36 in the sorted list of the set of selected database tables. If processor 52 has not yet selected any database tables 36 (i.e., this is the first time that processor 52 is performing step 122), then processor 52 selects the first database table 36 (i.e., the database that has the highest number of database records 38) in the sorted list.

In step 124, processor 52 compares the number of database records 38 in the selected database table, and if the number of the data records in the selected database table is less than the specified minimum record threshold (step 112), then in step 126, the backup processor selects the next database table 36 in the sorted set of tables (i.e., the database table in the sorted list that has the next highest number of database records 38).

However (i.e., in step 124), if the number of the data records in the selected database table is greater than or equal to the specified minimum record threshold, then in step 128 processor 52 determines whether or not the selected database table supports chunking (i.e., generating multiple remote backup table images 42 as a backup for the selected database table). For example, SALESFORCE™ typically provides notifications as to which objects (i.e., database tables 36) support chunking (i.e., the objects that support access by Bulk PK API 49C).

If (i.e., in step 128), processor 52 determines that the selected database table supports chunking, then in step 130, the backup processor can compute an API increment value comprising a number of Bulk PK API calls 49C that are required to generate multiple remote backup table images 42 as a backup for a selected database table. For example, if the chunking size is 250,000 and the selected database table comprises 9, 867, 433 database records 36, then backing up the selected database table requires 40 remote backup table images 42. In this example, processor 52 may convey, to API 50, 41 API calls 49 to back up the selected database table as follows:

- A single Bulk PK API call 49C to generate the 40 remote backup table images 42.
- Forty "batched" API calls 49, that (as described supra) processor 52 calls so as to download each of the generated remote backup table images 42.

In step 132 (FIG. 6B), processor 52 assigns, to the selected database table, Bulk PK API call 49C. In some embodiments, since Bulk PK API call 49C is assigned to the selected database table, processor 52 can generate a backup of the selected database table, by conveying Bulk PK API calls 49C to API 50 (as described in the description referencing the second embodiment in FIG. 4 hereinabove).

In step 134, processor 52 compares the (current) Bulk API call count to the Bulk API call limit, and if the backup processor determines the Bulk API call count is less that the Bulk API call limit, then in step 136, the backup processor adds the computed API increment value (step 130) to the Bulk API call count.

In step 138, processor 52 determines whether or not there are any unselected database tables 36 in the sorted list of database tables (step 120). If (i.e., in step 138) processor 52 detects any unselected database tables 36 in the sorted list, then the method continues with step 122 (FIG. 6A).

However (i.e., in step 138), if processor 52 does detect any unselected database tables 36 in the sorted list (i.e., all the database tables have been selected), then in step 140, the backup processor backs up the selected database tables using their respected assigned API calls 49, and the method ends. When performing step 140:

- If processor 52 assigned REST API call 49A to a given database table 36, then the backup processor can generate a backup for the given database table by conveying one or more REST API calls 49A to API 50.
- If processor 52 assigned Bulk API call 49B to a given database table 36 (i.e., with the not-chunking parameter), then the backup processor can generate a backup for the given database table by conveying a single Bulk API call 49B to API 50.
- If processor 52 assigned Bulk PK API 49C to a given database table 36, then the backup processor can generate a backup for the given database table by conveying, to API 50, a single Bulk PK API call 49C and a computed number (i.e., as computed in the description referencing step 130 hereinabove) of "download" API calls 49 so as to download the batch of generated remote backup table images 42.

In some embodiments, processor 52 can convey API calls 49 to API 50 via NIC 56 over data network 26.

Returning to step 134, if processor 52 detects that the Bulk API call count is greater than or equal to the Bulk API call limit, then in step 142, the backup processor resets the API assignment to the selected database table by reassigning REST API call 49A to the selected database table, and the method continues with step 140.

As described supra, processor 52 can partition database tables into first and second subsets, and Bulk API calls 49B and 49C may have a quota comprising the Bulk API call limit. Therefore, processor 52 can execute embodiments described in steps 134, 136 and 142 so as to assign the selected database table to a given subset responsively to the quota.

Returning to step 128 (FIG. 6A), If processor 52 determines, based on one or more table attributes (not shown) for the selected database table, that the selected database table does not support chunking, then in step 144 (FIG. 6B), processor 52 determines whether or not the selected database table 36 supports access via API calls 49A or 49B.

For example, processor 52 may specify a specific minimum size threshold for Bulk API call 49B. In this example, Bulk API call 49B would be supported for any database table 36 whose size is at least the minimum threshold, and Bulk API call 49B would not be supported for any database table 36 whose size is less than the minimum threshold. In one embodiment, the minimum threshold may be a specific number of records 46 in a given database table 36. In another embodiment, the minimum threshold may be a specific size (e.g., 10 megabytes) of a given database table 36.

If (i.e., in step 144) processor 52 determines that the selected database table supports bulk API 49B, then in step 146, the backup processor sets the API increment value to "1". In step 148, processor 52 assigns, to the selected database table, Bulk API call 49B, and the method continues with step 134. In some embodiments, since Bulk API call 49B is assigned to the selected database table, processor 52 can generate a backup of the selected database table, by conveying Bulk API calls 49B to API 50 (as described in the description referencing the first embodiment in FIG. 4 hereinabove).

Returning to step 144, if processor 52 determines that the selected database table does not support bulk API 49B, then the method continues with step 138.

As described supra, processor 52 can partition database tables into first and second subsets. Therefore, processor 52 can execute embodiments described in steps 128, 132, 144 and 148 so as to assign the selected given subset responsively to the table attributes of the selected database table. Additionally or alternatively, processor 52 can execute embodiments described in steps 124-136 and steps 142-148 so as to assign the selected database table to a given subset responsively to the number of database records 38 in the selected database table.

In some embodiments, processor 52 can detect that a given database table 36 does not comprise any updates since the most recent previous backup. In these embodiments, processor can generate a new remote backup table image 42 that simply comprises a link (i.e., one or more URLs or a path and one more file names) to one or more previously generated a new remote backup table images 42 that store the most recent previous backup of the given database table.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for data access, comprising:

identifying a set of tables in a database to be accessed by an application;

identifying first and second application programming interface (API) calls having different, respective access properties for accessing records in the tables via an API, wherein the first API call is subject to a predefined limit on calls made during a specified time period;

counting, by a processor, respective numbers of the records in the tables;

partitioning the set of tables into first and second subsets by adding the tables to the first subset responsively to the respective numbers until the tables in the first subset reach the predefined limit and adding the remaining tables to the second subset;

accessing the records in the first subset of the tables by conveying, by the application, the first API call to the API; and accessing the records in the second subset of the tables by conveying, by the application, the second API call to the API.

2. The method according to claim 1, wherein a given table comprises a customer relationship management data file.

3. The method according to claim 1, wherein accessing the records in the first and the second subsets comprises generating a set of backup files for the set of tables.

4. The method according to claim 3, wherein generating a given backup file comprises storing, to the given backup file, a link to a previously generated backup file.

5. The method according to claim 3, wherein the backup files comprise structured text files.

6. The method according to claim 5, wherein the structured text files comprise comma-separated (CSV) files.

7. The method according to claim 5, and further comprising compressing a given structured text file so as to generate a compressed backup file.

8. The method according to claim 3, wherein accessing, in a given table, the records with a given access property comprises conveying a request for one or more attribute values in one or more records in the given table, receiving the requested attribute values, and saving the received attribute values to a corresponding set of one or more records in a given backup file.

9. The method according to claim 1, wherein accessing, in a given table, the records with a given access property comprises conveying a request to generate a given backup file for a given table.

10. The method according to claim 9, wherein the request to generate a given backup file for a given table comprises a request to generate a plurality of backup files that store copies of attribute values in respective subsets of the records in the given table.

11. The method according to claim 10, and further comprising conveying a request to combine the plurality of backup files into a single combined backup file.

12. The method according to claim 1, wherein the first and the second subsets comprise disjoint subsets of the tables.

13. The method according to claim 12, wherein the disjoint subsets cover the set of tables.

14. The method according to claim 1, wherein the tables comprise table attributes, and wherein partitioning the set of tables into first and second subsets comprises assigning one or more of the tables to the first subset responsively to the respective table attributes of the tables.

15. The method according to claim 1, wherein the first API call is a bulk API call, and the second API call is a REST API call.

16. An apparatus for data access, comprising:

a network interface controller (NIC); and a processor configured:

to identify a set of tables in a database to be accessed by an application, to identify first and second application programming interface (API) calls having different, respective access properties for accessing records in the tables via an API, wherein the first API call is subject to a predefined limit on calls made during a specified time period, to count respective numbers of the records in the tables, to partition the set of tables into first and second subsets by adding the tables to the first subset responsively to the respective numbers until the tables in the first subset reach the predefined limit and adding the remaining tables to the second subset, to access the records in the first subset of the tables by conveying, by the application over a data network via the NIC, the first API call to the API, and to access the records in the second subset of the tables by conveying, by the application over a data network via the NIC, the second API call to the API.

17. The apparatus according to claim 16, wherein the processor is configured to access the records in the first and the second subsets to generate a set of backup files for the set of tables.

18. The apparatus according to claim 16, wherein the first API call is a bulk API call, and the second API call is a REST API call.

19. A computer software product for data access, the product comprising a non-transitory computer-readable medium, in which program instructions are stored, which instructions, when read by a computer, cause the computer:

to identify a set of tables in a database to be accessed by an application;

to identify first and second application programming interface (API) calls having different, respective access properties for accessing records in the tables via an API, wherein the first API call is subject to a predefined limit on calls made during a specified time period;

to count respective numbers of the records in the tables;

to partition the set of tables into first and second subsets by adding the tables to the first subset responsively to the respective numbers until the tables in the first subset reach the predefined limit and adding the remaining tables to the second subset;

to access the records in the first subset of the tables by conveying, by the application, the first API call to the API; and to access the records in the second subset of the tables by conveying, by the application, the second API call to the API.

* * * * *